US010473084B2

(12) United States Patent
Van Rompay (10) Patent No.: US 10,473,084 B2
(45) Date of Patent: Nov. 12, 2019

(54) DEVICE FOR GENERATING HYDRO-ELECTRIC ENERGY

(71) Applicant: Boudewijn Gabriel Van Rompay, Clearwater, FL (US)

(72) Inventor: Boudewijn Gabriel Van Rompay, Clearwater, FL (US)

( * ) Notice: Subject to any disclaimer, the term of this patent is extended or adjusted under 35 U.S.C. 154(b) by 327 days.

(21) Appl. No.: 15/323,795

(22) PCT Filed: Jun. 11, 2015

(86) PCT No.: PCT/IB2015/000920
§ 371 (c)(1),
(2) Date: Jan. 4, 2017

(87) PCT Pub. No.: WO2016/001725
PCT Pub. Date: Jan. 7, 2016

(65) Prior Publication Data
US 2017/0167469 A1    Jun. 15, 2017

(30) Foreign Application Priority Data
Jul. 4, 2014  (BE) .................................. 2014/0514

(51) Int. Cl.
*F03B 17/06* (2006.01)
*F03B 13/26* (2006.01)
*F03B 15/00* (2006.01)

(52) U.S. Cl.
CPC .......... *F03B 17/063* (2013.01); *F03B 13/264* (2013.01); *F03B 15/00* (2013.01);
(Continued)

(58) Field of Classification Search
CPC ............................. F03B 17/063; F03B 17/062
See application file for complete search history.

(56) References Cited

U.S. PATENT DOCUMENTS 1,761,818 A  *  6/1930  De Spuches ........... B63H 19/04
                                                      415/124.1
2,413,173 A  *  12/1946  Cote ....................... B63H 5/02
                                                      440/91
(Continued)

FOREIGN PATENT DOCUMENTS

FR  2 948 422 A1   1/2011
GB  2 119 449 A   11/1983
(Continued)

OTHER PUBLICATIONS

International Search Report, dated Oct. 19, 2015, from corresponding PCT application.

*Primary Examiner* — Carlos A Rivera
*Assistant Examiner* — Behnoush Haghighian
(74) *Attorney, Agent, or Firm* — Young & Thompson (57) ABSTRACT

Device for generating energy making use of the current of a river (2), with a self-floating paddlewheel (13) and an electric generator set (17) that is coupled to the paddlewheel (13), whereby the device (1) is provided with an immersed housing (3) with an open bottom (4) in which the paddlewheel (13) is rotatably affixed and whereby there is a unit (10) to control the flow of the river (2) at the level of the paddlewheel (13), whereby the speed of the generator set (17) is kept constant by controlling the water level (9) in the housing (3) by placing its internal space (7) under pressure and/or by controlling the aforementioned unit (10).

19 Claims, 5 Drawing Sheets

(52) U.S. Cl.
CPC ....... *F03B 17/062* (2013.01); *F05B 2220/706* (2013.01); *F05B 2240/50* (2013.01); *F05B 2240/60* (2013.01); *F05B 2240/93* (2013.01); *F05B 2240/932* (2013.01); *F05B 2240/97* (2013.01); *F05B 2270/1014* (2013.01); *Y02E 10/28* (2013.01)

(56) References Cited

U.S. PATENT DOCUMENTS

| | | | | |
|---|---|---|---|---|
| 4,023,915 | A * | 5/1977 | Kerby | F03B 17/063 415/148 |
| 5,430,332 | A * | 7/1995 | Dunn, Jr. | F03B 7/00 290/43 |
| 6,860,219 | B1 * | 3/2005 | Dempster | B63B 21/22 114/264 |
| 6,935,808 | B1 * | 8/2005 | Dempster | B63B 35/44 405/28 |
| 7,352,074 | B1 * | 4/2008 | Pas | B63B 21/50 290/43 |
| 7,696,633 | B2 * | 4/2010 | Zajchowski | F03B 17/063 290/43 |
| 7,713,020 | B2 * | 5/2010 | Davidson | F03B 3/183 415/1 |
| 7,928,594 | B2 * | 4/2011 | Shreider | F03B 11/08 290/54 |
| 8,310,078 | B2 * | 11/2012 | Shreider | F03B 17/065 290/42 |
| 8,690,477 | B2 * | 4/2014 | Dempster | F03B 17/063 290/54 |
| 2008/0088135 | A1 * | 4/2008 | Novo Vidal | F03B 13/083 290/54 |
| 2010/0237625 | A1 * | 9/2010 | Dempster | F03B 7/00 290/54 |
| 2010/0237626 | A1 * | 9/2010 | Hamner | F03B 17/065 290/54 |
| 2012/0086207 | A1 * | 4/2012 | Gray | F03B 17/063 290/54 |
| 2014/0062092 | A1 * | 3/2014 | Stausgaard | F03B 7/00 290/54 |
| 2014/0138954 | A1 * | 5/2014 | Antonucci | F03B 17/061 290/54 |

FOREIGN PATENT DOCUMENTS

| | | |
|---|---|---|
| WO | 2007/053824 A2 | 5/2007 |
| WO | 2007/072513 A1 | 6/2007 |
| WO | 2007/129185 A2 | 11/2007 |
| WO | 2014/111800 A2 | 7/2014 |

* cited by examiner

DEVICE FOR GENERATING HYDRO-ELECTRIC ENERGY

BACKGROUND OF THE INVENTION

Field of the Invention

The present invention relates to a device for generating hydroelectric energy.

More specifically the invention is intended for generating hydroelectric energy making use of the current of a river, estuary or similar.

Description of the Related Art

Devices that make use of the flow of water to generate energy are already known. A practical example of such a device is a hydropower station.

Such a hydropower station requires the construction of reservoirs with the aid of one or more dams, whereby the location of these reservoirs must be chosen carefully and not all rivers are suitable for this.

These reservoirs can also have a detrimental impact on nature, because they interfere with the natural habitat of animals and plants, and entail a large loss of land area such that entire villages or towns often have to be relocated and these reservoirs can also mean a hazard in the event of the failure of the dams.

Moreover, the hydropower station and the dams are large and complex constructions, such that the construction of such installations is an expensive, long and complicated matter.

In addition, such a hydropower station forms an impediment to water transport.

Moreover, the turbines that are used are largely under water, which means that the turbines and the generators connected to them have to be carefully sealed, which complicates maintenance or repairs.

A type of underwater turbine is already known, whereby a screw propeller, rotor or similar is placed under water, which will begin to rotate due to the flow of the water and in this way can generate electrical energy.

Such known installations present the disadvantage that the turbines and the generators connected to them have to be carefully sealed to prevent the harmful effects of exposure to the water.

This not only makes the installation expensive, but also difficult to maintain.

Moreover the rotating blades of the screw propeller, rotor or similar form a hazard to marine life.

BRIEF SUMMARY OF THE INVENTION

The purpose of the present invention is to provide a solution to at least one of the aforementioned and other disadvantages.

The object of the present invention is a device for generating hydroelectric energy making use of the current of a river, estuary or similar, whereby this device comprises a self-floating paddlewheel that can freely turn in two directions around an axis, and comprises at least one electric generator set whose driveshaft is coupled to the shaft of the paddlewheel in a way to transmit torque, whereby the device is provided with an entirely or at least partially immersed housing in the form of a bell with an open bottom that is at a height above the bed of the river, estuary or similar, whose internal space is placed under pressure to control the height of the water level in the bell, and in which the paddlewheel is rotatably affixed by means of bearings or similar with paddles that protrude below the open bottom, and that the device is provided with means to control the flow of the river, estuary or similar under the open bottom of the bell at the level of the paddlewheel, whereby the speed of the at least one electric generator set is kept constant by controlling the height of the water level in the bell and/or by controlling the aforementioned means.

An advantage is that the device is less subject to maritime conditions, such as waves or extreme weather conditions. The device is also hidden from view, such that the natural appearance of the river, estuary or similar is not disturbed.

Additionally a device according to the invention can be provided in a river, estuary or similar at such a depth that ships can sail over it without experiencing any hindrance.

Another advantage is that the generator set can be placed in the bell completely above the water surface, such that these parts of the device are not exposed to the water so that their construction and in particular their sealing do not have to satisfy such strict requirements. In addition maintenance and repair works can be done more easily and cheaply.

Another advantage is that the self-floating nature of the paddlewheel will at least cancel out a part of the weight of the paddlewheel due to the upward force that the paddlewheel experiences from the water.

As a result the energy transfer from the paddlewheel to the generator will be coupled with lower losses, because fewer friction losses will occur in the bearings or similar with which the paddlewheel is mounted in the bell.

An additional advantage is that by keeping the speed of the generator constant or by controlling the means for controlling the flow of the river, estuary or similar under the open bottom of the bell at the level of the paddlewheel or by controlling the height of the water level in the bell, the generator can produce energy in the most optimum possible way.

Indeed by controlling the flow of the river the paddlewheel will rotate faster or more slowly, such that the generator will also rotate faster or more slowly. The relationship between the speed of the flow and the speed of the paddlewheel follows a cubic or exponential relationship. In other words: a doubling of the speed of the flow of the river will ensure that the paddlewheel can rotate at least eight times faster.

When the current of the river increases, the aforementioned means will ensure that the flow under the open bottom of the bell is reduced so that the paddlewheel will rotate at the same speed.

By changing the height of the water level in the bell, the paddlewheel will be in the water to a greater or lesser extent. This water will ensure increased resistance such that the speed of rotation of the paddlewheel will slow down with a constant flow of the river, estuary or similar.

Preferably for keeping the speed of the at least one generator set constant, use is made of the aforementioned means to control the flow of the river, estuary or similar under the open bottom of the bell at the level of the paddlewheel, and the height of the water level in the bell is controlled such that the friction in the bearings is a minimum or as good as a minimum.

This will ensure that the energy production by the generator sets will be as efficient as possible. Indeed, there will be no or as good as no friction losses in the bearings on the shaft of the paddlewheel when the height of the water level in the bell is chosen such that the location of the shaft of the paddlewheel, when it floats freely on the water surface, corresponds to the location of the bearings by which the shaft of the paddlewheel is affixed in the housing.

Moreover the driveshaft of the generator sets will always be driven at the same speed such that no extra additional means, with accompanying losses in the generated power, are required to realise this.

The invention also concerns a series of devices according to the invention, whereby they are placed in a tidal river or estuary at a distance from one another viewed in the direction of flow of the tidal river or the estuary and are spread over such a distance of the tidal river or estuary that at least one device is always in a zone with current.

BRIEF DESCRIPTION OF THE DRAWINGS

With the intention of better showing the characteristics of the invention, a few preferred embodiments of a device for generating hydroelectric energy according to the invention are described hereinafter by way of an example, without any limiting nature, with reference to the accompanying drawings, wherein.

DETAILED DESCRIPTION OF THE PREFERRED EMBODIMENTS

Figure 1:
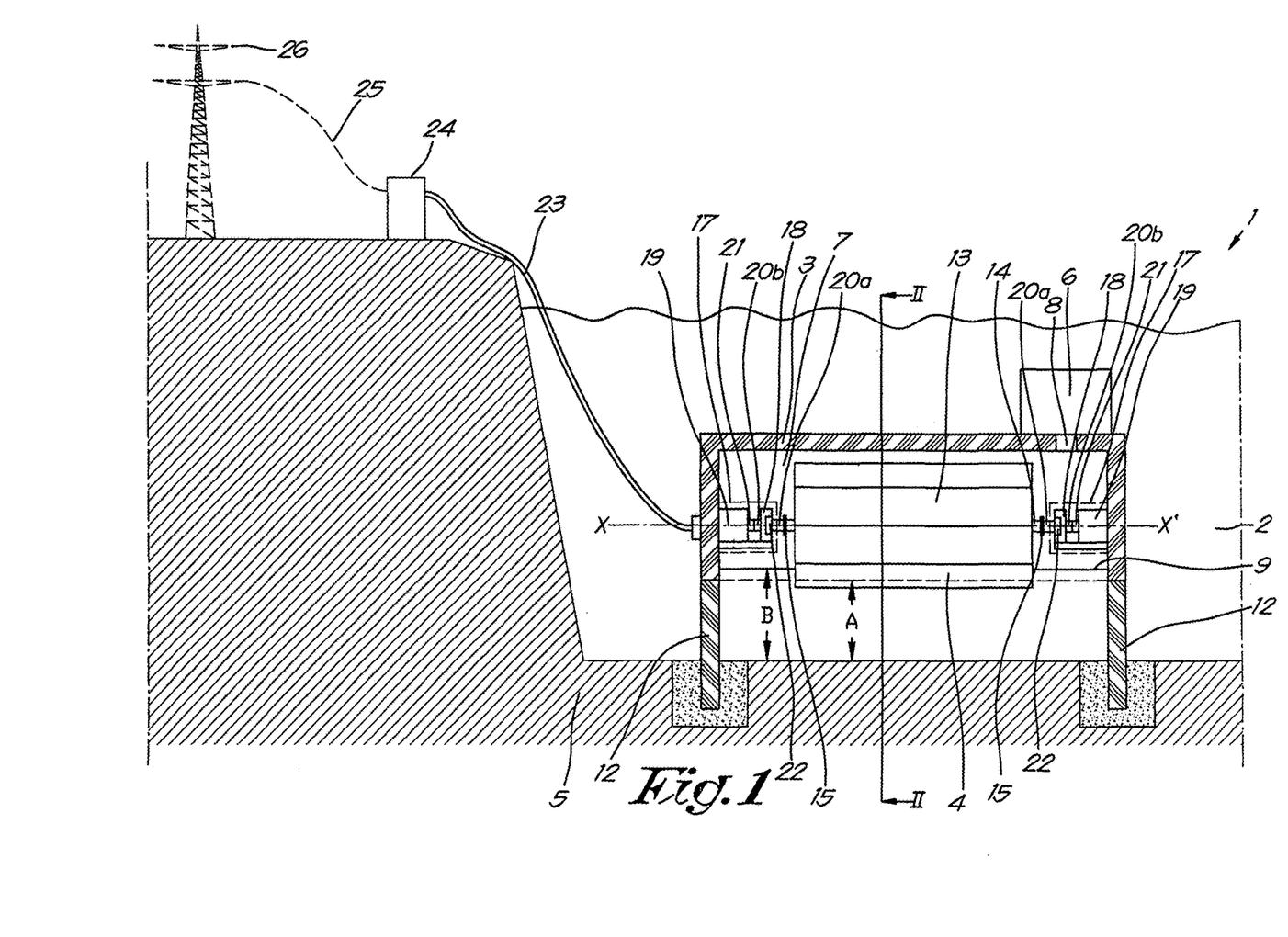
FIG. 1 schematically shows a preferred embodiment of a device according to the invention for generating hydroelectric energy whereby the device is affixed in a tidal river.
Figure 2:
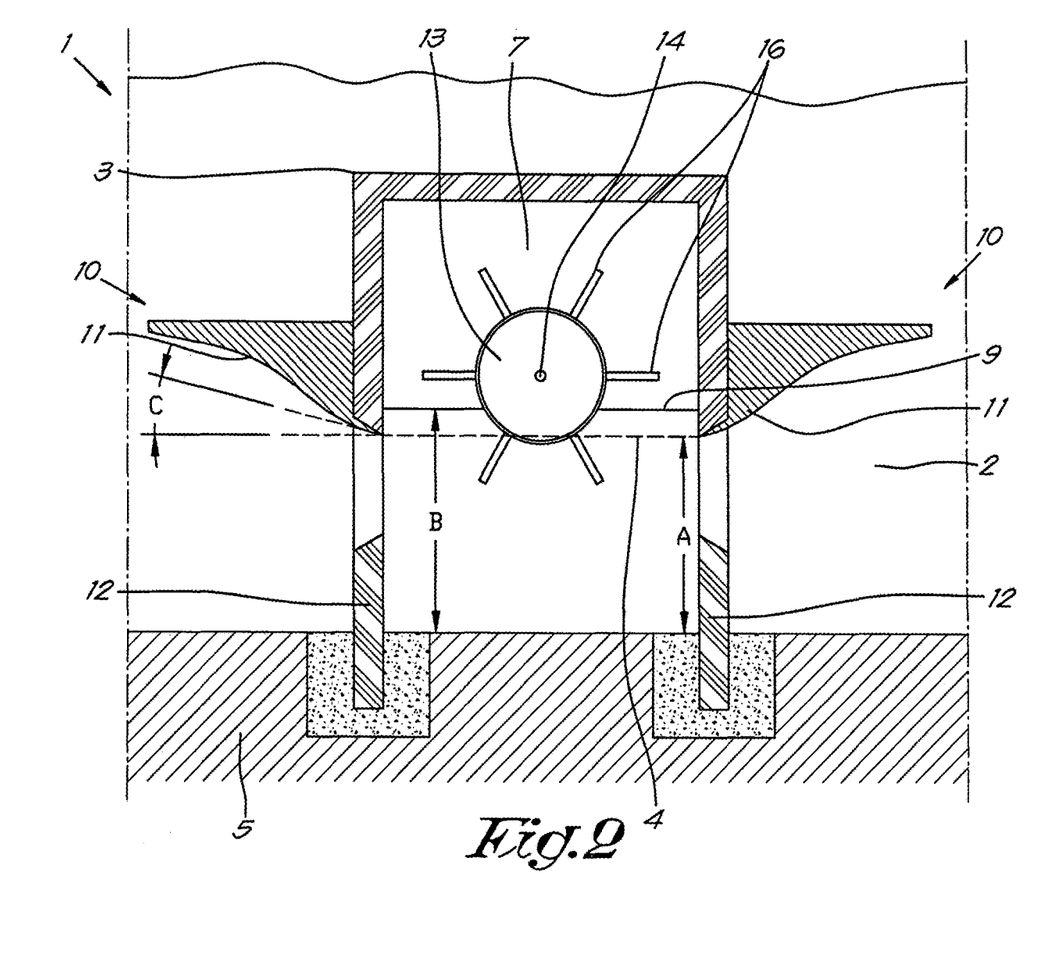
FIG. 2 schematically shows a cross-section according to the line II-II' of FIG. 1.

The device 1 shown in FIGS. 1 and 2 according to the invention is placed in a tidal river 2 and essentially consists of an immersed housing in the form of a bell 3 with an open bottom 4 that is at a distance A from the bed 5 of the tidal river 2.

The housing 3 is provided with means for adapting the pressure in the internal space 7 of the housing. In this case the means comprise a compressed air installation 6 whose output 8 is connected to the aforementioned internal space 7.

Because of the pressure in the internal space 7, the internal space 7 is partly filled with compressed air and partly filled with water. By controlling this pressure the height B of the water level 9 in the housing 3 can be controlled. In other words: the compressed air installation 6 will be able to control the height B of the water level 9.

Means 10 are provided at the open bottom 4 to control the flow of the river 2, estuary or similar under the open bottom 4 of the bell 3.

In this case the aforementioned means 10 are formed by a profiled element 11 at the location of the open bottom 4 that is placed at an angle C to the bed 5 of the tidal river 2, whereby in this case the size of the angle C can be adjusted.

Because in this case the device 1 is placed in a tidal river 2 or similar, there are two profiled elements 11, one in each flow direction. However, this is not necessarily so.

The aforementioned angle C can be adjusted by means of a drive or controller not shown in the drawings. It is clear that as a result the speed of the flow under the open bottom 4 of the bell 3 can be changed.

The form, more specifically the profile or curvature, of the profiled element 11 can be optimised according to the current or current pattern of the river 2.

Use can hereby be made of computational fluid dynamics or CFD simulations in combination with parallel tests in current pools to determine this optimised or streamlined form.

In this way the speed of the current will be a maximum under the open bottom.

Instead of or in addition to controlling the angle C it is possible that the form or curvature of the profiled element 11 can be adjusted.

As a result of this control the optimised form can be departed from and the flow speed can be reduced at the location of the open bottom 4.

It is also possible that instead of a profiled element 11, a plate 11 is used. This plate can be a flat plate 11 for example, of which the size of the angle C that the plate 11 makes with the bed 5 of the tidal river 2 can be adjusted.

Four posts 12, that are connected to the housing 3 and are anchored in the bed 5 of the tidal river 2, ensure that the device 1 is kept in place and with its open bottom 4 at the suitable height B above the bed 5 of the tidal river 2.

It is clear that more or less than four posts 12 can be provided.

It is also clear that it is also possible for the housing 3 to be kept in place at a height A above the bed 5 of the river 2, estuary or similar by means of one or more anchor chains that are anchored in the bed 5 of the river 2, estuary or similar.

This has the advantage that the device 1 can easily be moved to another location by releasing the anchor chains and anchoring at another location in the bed 5 of the river 2.

In this way it can always be ensured that the device 1 is at the most optimum location, taking account of the possible changing currents in the river, estuary or similar. For example, in this way it can be ensured that a device 1 can follow the Gulf Stream off the coast of Miami.

There is a paddlewheel 13 in the housing 3. The paddlewheel 13 is self-floating, for example because the shaft 14 of the paddlewheel 13 is made of a floating material or is made to float by an air chamber.

The shaft 14 of the paddlewheel 13 is freely rotatable around a geometric axis X-X' and to this end is mounted in the housing 3 using bearings 15.

On the shaft 14 of the paddlewheel 13, a number of radially oriented paddles 16 are affixed that extend in the longitudinal direction in parallel to the shaft 14 of the paddlewheel 2.

The device 1 is further provided with two generator sets 17, whereby one is placed on each side of the paddlewheel 13, whereby the generator sets 17 are fastened to the inside of the bell 3.

Each generator set 17 is provided with a transmission 18 and a generator 19 connected thereto. The transmission 18 is provided with an ingoing driveshaft 20a that is coupled to the shaft 14 of the paddlewheel 13 and an outgoing shaft 20b that is coupled to the shaft 21 of the generator 19.

In this case the driveshaft 20a of the left generator set 17 will turn with the shaft 14 of the paddlewheel 13 in a first direction of rotation and is freely rotatable in another second direction of rotation and the driveshaft 20a of the right generator set 17 is freely rotatable in the first direction of rotation and will turn with the shaft 14 of the paddlewheel 13 in the second direction of rotation.

To this end the transmission 18 of the generator set 17 is provided with a freewheel 22 that enables a free rotation in one direction and a forms a locked rotating coupling in the other direction of rotation.

The generator sets 17 are preferably direct current generator sets, whereby the generator sets 17 are connected by means of an electric cable 23 to an inverter 24 that converts the direct current supplied into alternating current that can be supplied to the electricity network 26 by a cable 25.

The operation of the device 1 is very simple and as follows.

The current of the tidal river 2 will make the paddlewheel 13 turn. Depending on the direction of flow of the tidal river 2, the paddlewheel 13 will be driven in one direction of rotation or in the reverse direction of rotation.

This means that either the left or the right generator set 17 will rotate with the paddlewheel 13 so that electric power is always generated irrespective of the direction of the flow of the tidal river 2 or irrespective of the direction of rotation of the paddlewheel 13. The transmission 18 will ensure that the rotational speed of the paddlewheel 13 is transmitted to the generator 19 with a suitable transmission ratio.

Figure 3:
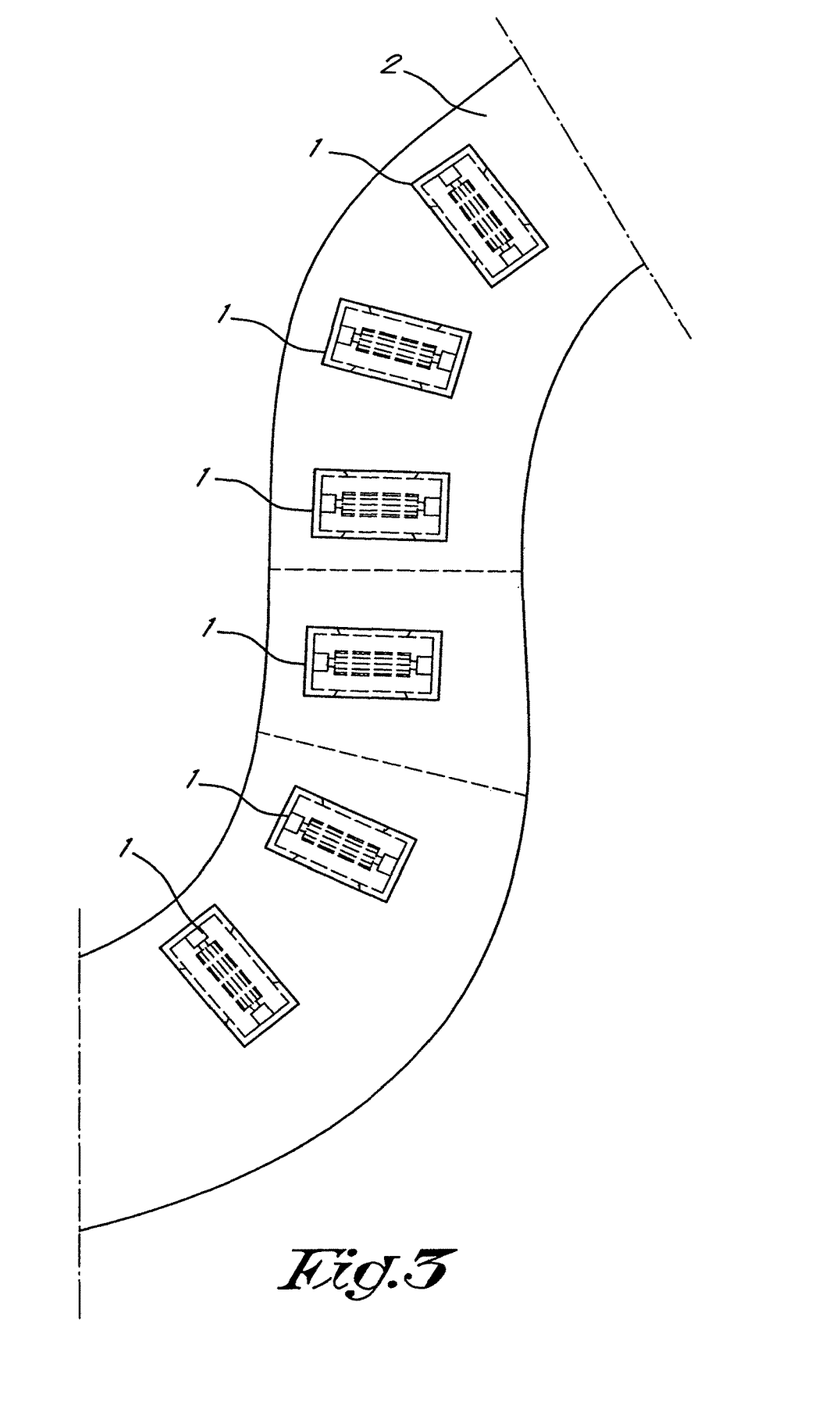
FIG. 3 shows a top view of a river in which a series of devices according to FIG. 1 are affixed.

Preferably a series of the aforementioned devices 1 according to the invention are spread over a distance of the tidal river 2 as shown in FIG. 3. In this way a device 1 will always be in a zone with current, even when the tide turns.

In order to increase the power generated by the generator 19 use can be made of two controls, i.e. the control of the profiled elements 11 on the one hand and the control of the height B of the water level 9 in the housing 3 on the other hand.

One of the two or both controls can be used to ensure that the speed of the generator 19, or thus of the generator set 17 of the paddlewheel 13, remains constant independently of the current in the river 2.

Hereby a type of cascade or master-slave control can be chosen, whereby the control of the water level 9 in the bell is the master control and the control of the profiled elements 11 is the slave control.

By keeping the speed of the generator set 17 constant the electric power production by the generator 19 will be as optimum as possible without extra additional means, with associated losses in the generated power, being required to keep the speed of the shaft 21 of the generator 19 constant despite the variable speed of the paddlewheel 13.

Preferably however, to keep the speed of the generator set constant, use is only made of the control of the profiled elements 11.

The control of the water level 9 in the bell 3 by means of the compressed air installation 6 is used to ensure that the friction in the bearings 15 with which the shaft 14 of the paddlewheel 13 is mounted in the housing 3 is a minimum or as good as a minimum.

Indeed, due to the self-floating nature, it can be ensured that the paddlewheel 13 does not exert any force on the bearings 15 by its weight. This can be realised by suitably choosing the height B of the water level 9 in the bell 3.

As a result the frictional force in the bearings 15 can be minimised such that no (friction) losses will occur and the energy conversion can be as efficient as possible.

Due to the combination of both controls, i.e. the control of the profiled elements 11 to keep the speed of the generator 19 constant and the control of the water level 9 to keep the frictional losses at a minimum, only very minimal losses will occur.

The device 1 according to the invention will hereby have a higher efficiency than conventional devices that do not have these controls.

In a practical embodiment sensors are provided that determine the frictional force in the bearings 15 and the height B of the water level 9 in the bell 3 is controlled on the basis of the frictional force so determined.

The outgoing signal from these sensors can be coupled to the control of the compressed air installation 6 for example.

Additionally sensors can also be provided that determine the speed of the at least one generator set 17 and/or of the paddlewheel 13, and that on the basis of this determination the profiled elements 11 are controlled so that the speed of the generator set 17 is constant.

In the control of the height B of the water level 9 in the bell 3, it is preferably ensured that the shaft 14 of the paddlewheel 13 is above the level of the water surface 9 in the bell 3.

This has the advantage that the seals, bearings, etc., around the shaft 14 or the generator sets 17 do not have to be provided with special facilities to prevent damage by the water.

Figure 4:
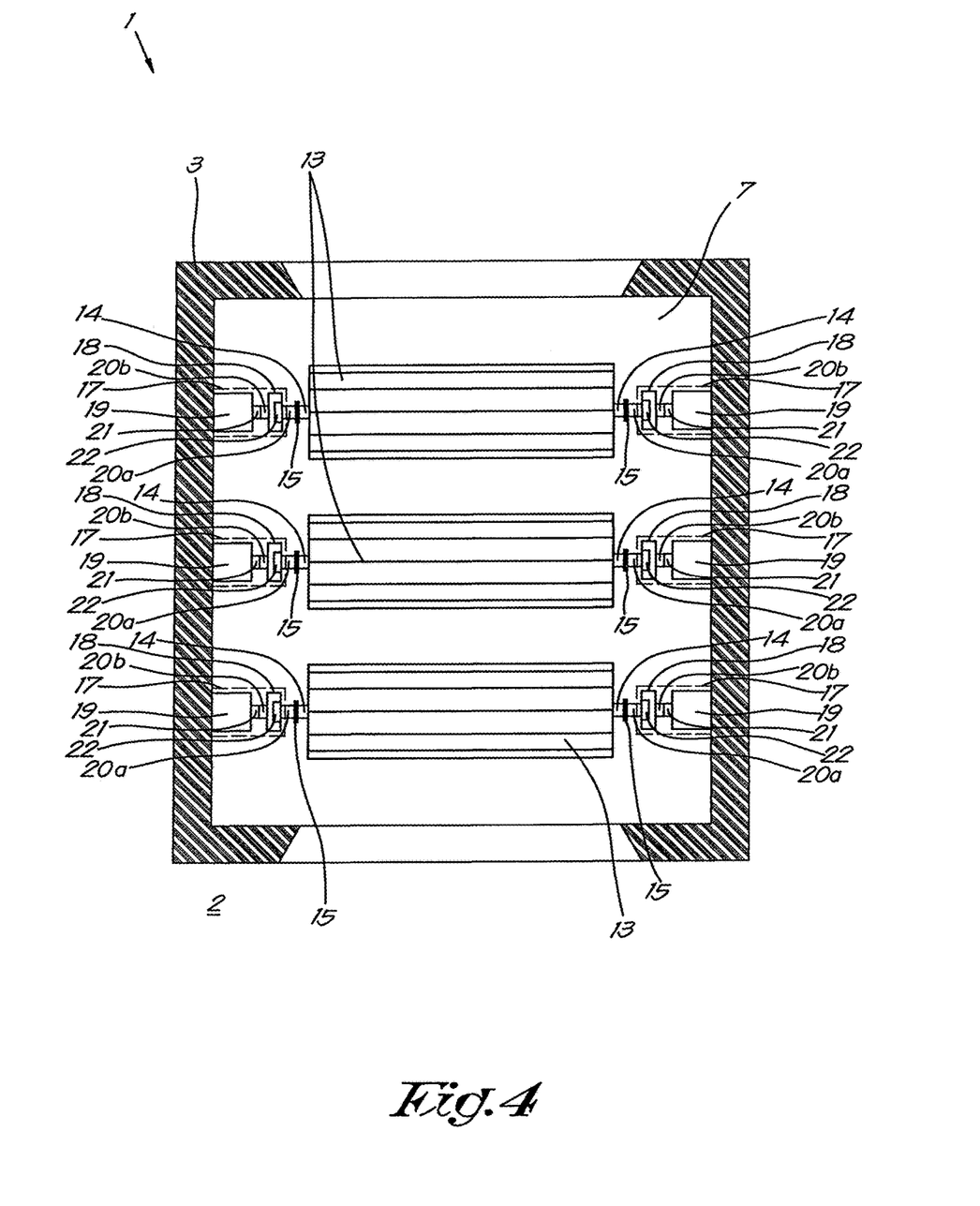
FIGS. 4 and 5 schematically show other alternative embodiments of a device according to the invention.

FIG. 4 shows a variant of the device 1 according to the invention, whereby in this case a number of paddlewheels 13 are affixed in the housing 3, whereby the paddlewheels 13 are placed with their shafts 14 parallel to one another and behind one another with respect to the direction of flow.

Due to the application of a number of paddlewheels 13 more electrical energy can be generated.

Preferably the height B of the water level 9 is controlled such that the average friction in the bearings 15 of the number of paddlewheels 13 is a minimum or as good as a minimum.

This will ensure that the total power produced by all generator sets 17 together is optimum.

Figure 5:
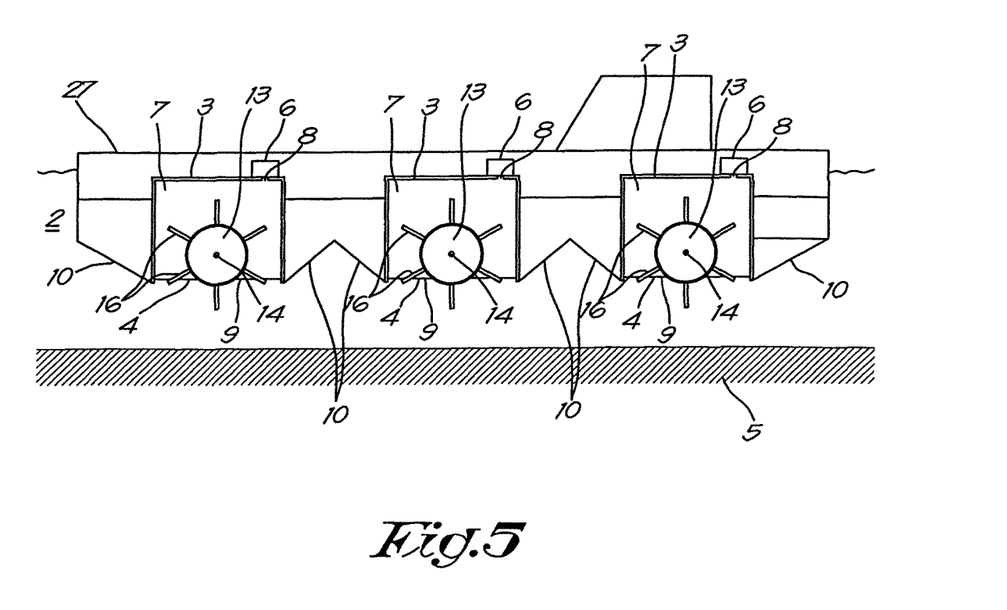

FIG. 5 shows another variant of a device 1 according to the invention, whereby in this case the housing 3 is kept at a height A above the bed 5 of the tidal river 2, estuary or similar by means of a floating structure 27 in which the housing is built.

In this case the floating structure 27 is a ship, that can be an old decommissioned ship that is recycled for this application, or a new ship that is specially designed for this purpose.

Moreover, in this case a number of housings 3 are provided, whereby a paddlewheel 13 is affixed in each housing 3, whereby the paddlewheels 13 are placed with their shafts 14 parallel to one another and behind one another with respect to the direction of flow and whereby in each housing 3 the height B of the water level 9 in the bell 3 concerned can be controlled separately so that for each paddlewheel 13 the friction in the bearings 15 is a minimum or as good as a minimum.

In this case each housing 3 is also provided with means 10 for controlling the flow, that can each be controlled separately so that the generator sets 17 of each paddlewheel 13 can be driven with a constant speed. In this case these means 10 take on the form of flat plates.

It is clear that although in the embodiments described above, the means 10 for controlling the flow of the river, estuary or similar under the open bottom 4 of the bell 3 at the level of the paddlewheel 13 are constructed in the form of profiled elements 11 or flat plates, but these means 10 can also be constructed in another way in all embodiments.

For example in the case of FIG. 5 the means 10 can be constructed as a flap that is hingeably fastened to the underside of the hull of the ship at the location of the housing 3. Another possibility consists of providing a partition on the underside of the ship that can be lowered.

The flow at the location of the open bottom 4 of the housing 3 can be controlled by pivoting the flap or raising or lowering the partition.

It is also clear that although in the embodiments described above the generator set 17 is provided with a freewheel 22 that enables a free rotation in the one direction and forms a locked rotating coupling in the other direction between the shaft 14 of the paddlewheel 13 and the ingoing driveshaft 20a of the transmission 18, it is also possible that the generator sets 17 comprise a transmission 18 between the generator 19 and the shaft 14 of the paddlewheel 13, whereby this transmission 18 comprises a mechanism for reversing the direction of rotation of the shaft 21 of the generator 19 with respect to the paddlewheel 13 to ensure that the generator 19 is always driven in the same direction irrespective of the direction of rotation of the paddlewheel 13.

The present invention is by no means limited to the embodiments described as an example and shown in the drawings, but a device 1 for generating hydroelectric energy according to the invention can be realised in all kinds of forms and dimensions, without departing from the scope of the invention.

The invention claimed is:

1. A device for generating hydroelectric energy making use of the current of a moving, partially enclosed body of water, the device comprising:
    at least one paddlewheel that is configured to float in the moving, partially enclosed body of water and freely turn in two directions around an axis;
    at least one electric generator set having a driveshaft coupled to a shaft of the paddlewheel to transmit torque;
    at least one housing configured to be entirely or at least partially immersed in the moving, partially enclosed body of water, the housing being in the form of a bell with an open bottom that is at a bottom housing height above a bed of the moving, partially enclosed body of water, the housing having an internal space that is placed under pressure to control a water level height of a water level in the bell, the paddlewheel being rotatably affixed to the housing by bearings, the paddlewheel including paddles that protrude below the open bottom; and
    a flow control system configured to control the flow of the moving, partially enclosed body of water that is under the open bottom of the bell,
    wherein a speed of the at least one electric generator set is kept constant by controlling one or more of the water level height in the bell and the flow control system.

2. The device according to claim 1, wherein the speed of the at least one electric generator set is kept constant using the flow control system configured to control the flow of the moving, partially enclosed body of water under the open bottom of the bell at the level of the paddlewheel.

3. The device according to claim 2, further comprising sensors configured to determine a frictional force in the bearings, and
    the water level height of the water level in the bell is controlled based on the determined frictional force.

4. The device according to claim 1, wherein the flow control system is formed by a curved element or a plate, the curved element or the plate being provided at the open bottom that is placed at an angle to the bed of the moving, partially enclosed body of water, the angle being adjustable.

5. The device according to claim 4, further comprising sensors that determine the speed of the at least one generator set and/or of the paddlewheel,
    wherein the flow control system is configured to be controlled on the basis of the determined speed such that the speed of the at least one generator set is constant.

6. The device according to claim 4, wherein the device is configured to be placed in the moving, partially enclosed body of water.

7. The device according to claim 1, further comprising a pressure adjusting device configured to adjust the pressure in the internal space.

8. The device according to claim 7, wherein the pressure adjusting device comprises a compressor having an output connected to the internal space.

9. The device according to claim 1, wherein the shaft of the paddlewheel is above the level of the water surface in the bell.

10. The device according to claim 1, wherein the at least one paddlewheel comprises a plurality of paddlewheels affixed in the housing, the paddlewheels being placed with the respective shafts parallel to one another and behind one another with respect to the direction of flow.

11. The device according to claim 10, wherein the at least one housing comprises a plurality of housings one of the plurality of paddlewheels is affixed in each housing, and
    the water level height in the bell of each housing is separately controllable.

12. The device according to claim 1, wherein the at least one generator set is a direct current generator set.

13. The device according to claim 1, wherein the at least one generator set includes a first generator set provided on one side of the at least one paddlewheel and a second generator set provided on another side of the at least one paddlewheel.

14. The device according to claim 13, wherein the drive shaft of the first generator set turns with the paddlewheel shaft in a first direction of rotation of the paddlewheel and is configured to freely turn in another second direction of rotation, and
    the drive shaft of the second generator set is configured to freely turn in the first direction of rotation and turns with the paddlewheel shaft of the paddlewheel in the second direction of rotation.

15. The device according to claim 14, wherein the at least one generator set comprises a freewheel that enables a free rotation in the one direction and forms a locked rotating coupling in the other direction of rotation.

16. A system comprising:
    a plurality of devices configured to generate hydroelectric energy making use of the current of a moving, partially enclosed body of water, the plurality of devices being disposed in the moving, partially enclosed body of water at a distance from one another viewed in a direction of flow of the moving, partially enclosed body of water and are spread over a distance of the moving, partially enclosed body of water such that at least one device is in a zone with current, each device comprising:
    at least one paddlewheel that is configured to float in the moving, partially enclosed body of water and freely turn in two directions around an axis,
    at least one electric generator set having a driveshaft coupled to a shaft of the paddlewheel to transmit torque,
    at least one housing configured to be entirely or at least partially immersed in the moving, partially enclosed body of water, the housing being in the form of a bell with an open bottom that is at a bottom housing height above a bed of the moving, partially enclosed body of water, the housing having an internal space that is placed under pressure to control a water level height of a water level in the bell, the paddlewheel being rotatably affixed to the housing by bearings, the paddlewheel including paddles that protrude below the open bottom, and a flow control system configured to control the flow of the moving, partially enclosed body of water that is under the open bottom of the bell, wherein a speed of the at least one electric generator set is kept constant by controlling one or more of the water level height in the bell and the flow control system.

17. The device according to claim 2, wherein the flow control system is formed by a curved element or a plate, the curved element or the plate being provided at the open bottom that is placed at an angle to the bed of the moving, partially enclosed body of water, the angle being adjustable.

18. The device according to claim 3, wherein the flow control system is formed by a curved element or a plate, the curved element or the plate being provided at the open bottom that is placed at an angle to the bed of the moving, partially enclosed body of water, the angle being adjustable.

19. The device according to claim 5, wherein the device is configured to be placed in the moving, partially enclosed body of water.

\* \* \* \* \*